US010773393B2

(12) United States Patent
Xu et al.

(10) Patent No.: US 10,773,393 B2
(45) Date of Patent: Sep. 15, 2020

(54) AUXILIARY BENDING ROBOT CAPABLE OF PROCESSING TWO WORKPIECES SIMULTANEOUSLY

(71) Applicant: Nanjing University Of Posts And Telecommunications, Jiangsu (CN)

(72) Inventors: Fengyu Xu, Jiangsu (CN); Min Xiao, Jiangsu (CN); Guoping Jiang, Jiangsu (CN)

(73) Assignee: Nanjing University Of Posts And Telecommunications, Jiangsu (CN)

( * ) Notice: Subject to any disclaimer, the term of this patent is extended or adjusted under 35 U.S.C. 154(b) by 131 days.

(21) Appl. No.: 16/086,605

(22) PCT Filed: Mar. 9, 2018

(86) PCT No.: PCT/CN2018/078497
§ 371 (c)(1),
(2) Date: Sep. 20, 2018

(87) PCT Pub. No.: WO2019/140762
PCT Pub. Date: Jul. 25, 2019

(65) Prior Publication Data
US 2020/0101622 A1 Apr. 2, 2020

(30) Foreign Application Priority Data
Jan. 17, 2018 (CN) .......................... 2018 1 0043746

(51) Int. Cl.
*B25J 15/00* (2006.01)
*B21D 5/00* (2006.01)
(Continued)

(52) U.S. Cl.
CPC .......... *B25J 15/0052* (2013.01); *B21D 5/004* (2013.01); *B21D 5/0281* (2013.01); *B25J 5/02* (2013.01);
(Continued)

(58) Field of Classification Search
CPC ...... B25J 9/1605; B25J 9/1625; B25J 9/1643; B25J 9/046; B25J 11/005; B25J 11/0095;
(Continued)

(56) References Cited

U.S. PATENT DOCUMENTS

| 4,590,578 A * | 5/1986 | Barto, Jr. | ............. B25J 15/0052 318/632 |
| 6,345,818 B1 * | 2/2002 | Stephan | ............... B25J 15/0061 271/91 |
| 2003/0180135 A1 * | 9/2003 | Sawdon | ............... B25J 15/0052 414/730 |

FOREIGN PATENT DOCUMENTS

| CA | 2922353 A1 * | 3/2015 | .......... B25J 15/0052 |
| CN | 103538060 | 1/2014 | |

(Continued)

OTHER PUBLICATIONS

"International Search Report (Form PCT/ISA/210)", dated Apr. 28, 2018, pp. 1-5.

*Primary Examiner* — Teresa M Ekiert
(74) *Attorney, Agent, or Firm* — JCIPRNET

(57) ABSTRACT

Provided is an auxiliary bending robot capable of processing two workpieces simultaneously, including a linear base slide rail, a slider, a movable major arm, a movable minor arm, a front arm, a swing link, and an additional seventh axis. The slider is slidably connected to the linear base slide rail, and a first axis is formed between the slider and the linear base slide rail. A top portion of the slider is directly or indirectly hinged to a rear end of the movable major arm through a second axis, a front end of the movable major arm is hinged to a rear end of the movable minor arm through a third axis, a front end of the movable minor arm is hinged to a rear end of the front arm through a fourth axis, and a front end of the front arm is rotatably connected to a middle portion of the swing link through a fifth axis. There are two additional (Continued)

seventh axes, the two additional seventh axes are symmetrically disposed on the swing link on two sides of the fifth axis, and each of the additional seventh axes is rotatably connected to the swing link. The present invention can bend two sheet metal plate parts at the same time, so that the efficiency is multiplied and the efficiency problem of automatic bending processing is practically resolved.

8 Claims, 5 Drawing Sheets

(51) Int. Cl.
*B21D 5/02* (2006.01)
*B25J 5/02* (2006.01)
*B25J 9/04* (2006.01)
*B25J 11/00* (2006.01)
*B25J 13/08* (2006.01)

(52) U.S. Cl.
CPC ............. *B25J 9/046* (2013.01); *B25J 11/005* (2013.01); *B25J 13/088* (2013.01)

(58) Field of Classification Search
CPC .......... B25J 5/0052; B25J 5/02; B25J 13/088; B21D 5/004; B21D 5/0281
See application file for complete search history.

(56) References Cited

FOREIGN PATENT DOCUMENTS

| | | |
|---|---|---|
| CN | 106903187 | 6/2017 |
| CN | 107081761 | 8/2017 |
| CN | 107249830 | 10/2017 |
| CN | 107262561 | 10/2017 |
| CN | 206661992 | 11/2017 |
| CN | 206717861 | 12/2017 |
| EP | 1702691 | 9/2006 |

* cited by examiner

AUXILIARY BENDING ROBOT CAPABLE OF PROCESSING TWO WORKPIECES SIMULTANEOUSLY

CROSS-REFERENCE TO RELATED APPLICATION

This application is a 371 of international application of PCT application serial no. PCT/CN2018/078497, filed on Mar. 09, 2018, which claims the priority benefit of China application no. 201810043746.9, filed on Jan. 17, 2018. The entirety of each of the above-mentioned patent applications is hereby incorporated by reference herein and made a part of this specification.

BACKGROUND

Technical Field

The present invention relates to the field of sheet metal plate processing, and in particular, to an auxiliary bending robot capable of processing two workpieces simultaneously.

Description of Related Art

In recent years, in the field of sheet metal plate processing, the application of automatic processing technologies becomes gradually popular. A core technology in the automation of sheet metal plate processing is the automation of plate bending. Especially, the processing of large-size, heavy-weight parts requires high labor intensity by workers, and two or even more operation workers are usually needed to complete the work. Therefore, the labor intensity is high, and the working environment is severe. It has already become the common understanding in the industry that the solution for automatic plate bending has huge market potential and vast development space.

Currently, there are mainly the following two solutions of automatic plate bending.

1. A universal six-joint robot is used. Specifically, referring to Chinese Invention Patent Application No. 201710513061.1, entitled "Robot Free of Interfere between Sheet Metal and Body during Automatic Bending", in which discloses a six-joint industrial robot, wherein a sum X of a rod length of a minor arm assembly and a rod length of a wrist assembly/a rod length Y of a major arm=2 to 3, an edge height of a lower die of a bending machine–a distance H of an axis J2 of a rotating base from the ground=500 mm to 600 mm, and a distance Z of the axis J2 of the rotating base from an axis J=an arm span of the robot/a set maximum side length of sheet metal–the sum X of the rod length of the minor arm assembly and the rod length of the wrist assembly–the rod length Y of the major arm. A set distance is offset between an axis J4 and the axis J1, and a motor of an axis J3 is disposed on the outer side of the major arm.

In the foregoing patent application, an appropriate rod length ratio relationship is used for bending of large-size sheet metal. Sheet metal and the body do not interfere with each other, so that various disadvantages of universal industrial robots in bending applications are avoided. However, because the number of control axes is large (six axes, and some degrees of freedom are redundant), the costs are high, and because the restrictions of arm span, the range of movement is small.

2. A cartesian coordinate robot is used. Specifically, referring to Chinese Invention Patent Application No. 201710110029.9, entitled "Gantry Bending Robot", the robot includes an X-axis guide rail, a Y-axis guide rail, and a Z-axis guide rail that are perpendicular to each other. The X-axis guide rail is fixedly connected to the body. The X-axis guide rail and the Z-axis guide rail are vertically connected through a first slider. An X-direction slider guide rail slidably connected to the X-axis guide rail and a Z-direction slider guide rail slidably connected to the Z-axis guide rail are respectively disposed on the first slider. A second slider is fixedly disposed at a lower end of the Z-axis guide rail. A Y-axis slider guide rail slidably connected to the Y-axis guide rail is fixedly disposed to the second slider. An axis A is rotatably connected to a front end of the Y-axis guide rail. An axis B perpendicular to the axis A is rotatably connected to the axis A. An axis C perpendicular to the axis B is rotatably connected to the axis B. An end actuator is disposed at a front end of the axis C. The patent application has advantages such as low costs and high load capability, but has obvious disadvantages such as a large structural size, a large coverage area, slow speed, and lack of flexibility.

Both the foregoing solutions of automatic plate bending have the following defects: The axial lines of two axes at the ends of a wrist joint intersect at a point mainly for convenience of solving kinematic equations. In addition, the solutions are applicable to bending of large-size workpieces. However, during bending of small-size workpieces, interference with a bending machine may occur easily. The solutions are absolutely not suitable for bending of small-size workpieces, and only one part can be processed at one time.

SUMMARY

In view of the foregoing deficiencies in the prior art, the technical problem to be resolved by the present invention is to provide an auxiliary bending robot capable of processing two workpieces simultaneously. The auxiliary bending robot capable of processing two workpieces simultaneously can bend two sheet metal plate parts at the same time, so that the efficiency is multiplied and the efficiency problem of automatic bending processing is practically resolved.

To resolve the foregoing technical problem, the technical solution used in the present invention is as follows:

An auxiliary bending robot capable of processing two workpieces simultaneously includes a linear base slide rail, a slider, a movable major arm, a movable minor arm, a front arm, a swing link, and an additional seventh axis.

The slider is slidably connected to the linear base slide rail, and a first axis is formed between the slider and the linear base slide rail.

A top portion of the slider is directly or indirectly hinged to a rear end of the movable major arm through a second axis, a front end of the movable major arm is hinged to a rear end of the movable minor arm through a third axis, a front end of the movable minor arm is hinged to a rear end of the front arm through a fourth axis, and a front end of the front arm is rotatably connected to a middle portion of the swing link through a fifth axis.

There are two additional seventh axes, the two additional seventh axes are symmetrically disposed on the swing link on two sides of the fifth axis, and each of the additional seventh axes is rotatably connected to the swing link.

The first axis, the second axis, the third axis, and the fourth axis are all parallel to each other, each of the additional seventh axes is parallel to the fifth axis, the fifth axis is perpendicular to the fourth axis, and one fixture that can hold a sheet metal plate workpiece is disposed at a top portion of each of the additional seventh axes.

The auxiliary bending robot further includes a rotational support, a bottom portion of the rotational support is rotatably connected to the top portion of the slider through an additional sixth axis, and a top portion of the rotational support is rotatably connected to the rear end of the movable major arm through the second axis.

An axial line of the fifth axis and an axial line of the fourth axis do not have an intersection.

A cartesian coordinate system is established by setting the origin on an axial line of the second axis, using a horizontal direction perpendicular to the axial line of the second axis as the X axis, and using a vertical direction as the Y axis, the coordinates of the center of the fourth axis in the cartesian coordinate system are ($d_x$, $d_y$), and formulas of calculating $d_x$ and $d_y$ are as follows:

$$d_x = X_0 - \sqrt{L_{10}^2 + L_{20}^2} \times \cos\left(\beta - \arctan\left(\frac{L_{10}}{L_{20}}\right)\right)$$

$$d_y = Y_0 - d + \sqrt{L_{10}^2 + L_{20}^2} \times \sin\left(\beta - \arctan\left(\frac{L_{10}}{L_{20}}\right)\right)$$

where in the formulas, $X_0$ is a distance along the X axis of a mold centerline in a bending machine, $Y_0$ is a lower die height of the bending machine, $L_{10}$ is a vertical offset distance of the fixture, $L_{20}$ is a horizontal offset distance of the fixture, and $\beta$ is an included angle between a sheet metal plate and a horizontal plane in a bending process.

The second axis, the third axis, and the fourth axis are linked to each other, it is assumed that a driving rotation angle of the second axis is $\theta_2$, a driving rotation angle of the third axis is $\theta_3$, a driving rotation angle of the fourth axis is $\theta_4$, and $\theta_2$, $\theta_3$, and $\theta_4$ satisfy the following formulas:

$$\theta_2 = a_2;$$

$$\theta_3 = a_3 - a_2;$$

$$\theta_4 = a_4 - a_3;$$

$$a_2 = \arctan\left(\frac{C_y}{C_x}\right) + \arccos\left(\frac{L_2^2 + C_x^2 + C_y^2 - L_3^2}{2L_2\sqrt{C_x^2 + C_y^2}}\right)$$

$$a_3 = \arctan\left(\frac{C_y - L_2\sin(a_2)}{C_x - L_2\cos(a_2)}\right)$$

$$a_4 = -\beta$$

$$C_x = d_x - L_4\cos(a_4)$$

$$C_y = d_y - L_4\sin(a_4)$$

where in the formulas, $a_2$ is an included angle between the movable major arm and the X axis, $a_3$ is an included angle between the movable minor arm and the X axis, $a_4$ is an included angle between the front arm and the X axis, $L_2$ is the length of the movable major arm, $L_3$ is the length of the movable minor arm, $L_4$ is the length of the front arm, and $C_x$ and $C_y$ are intermediate variables.

The included angle $\beta$ between the sheet metal plate and the horizontal plane in the bending process is calculated by using the following formula:

$$\beta = \arctan\left(\frac{2d}{B}\right),$$

where in the formula, B is the width of a lower die slot in the bending machine, and d is the work stroke of an upper die in the bending machine.

The auxiliary bending robot further includes two movable axes, each of the movable axes is disposed between the additional seventh axis and the swing link, the movable axis is slidably connected to the swing link, and a bottom portion of the additional seventh axis is rotatably connected to the movable axis.

The present invention has the following beneficial effects:

1. The foregoing arrangement of two additional seventh axes and a fifth axis can implement simultaneous bending of two sheet metal plate parts.

2. The present invention may be arranged, according to requirements, into six axes including a first axis, a second axis, a third axis, a fourth axis, a fifth axis, and two additional seventh axes, or may be arranged into seven axes including a first axis, a second axis, a third axis, a fourth axis, a fifth axis, an additional sixth axis, and two additional seventh axes. Compared with six joints in the prior art, the range of movement is larger. Compared with cartesian coordinates, the flexibility is higher. Blank material shelves and finished material shelves may have variable locations and quantities and can implement fully-automatic bending without manual intervention.

3. The foregoing arrangement of two additional seventh axes and a fifth axis can adjust the positioning precision of sheet metal plates, thereby preventing positioning deviations of position and angles.

Where: 10, linear base slide rail; 20, slider; 30, rotational support; 31, additional sixth axis; 40, movable major arm; 41, second axis; 50, movable minor arm; 51, third axis; 60, front arm; 61, fourth axis; 70, swing link; 71, fifth axis; 80, additional seventh axis; 81, movable axis; 90, bending machine; 101, mold centerline; 92, displacement sensor; 100, blank material shelf; 110, finished material shelf; and 120, sheet metal plate.

DETAILED DESCRIPTION OF EMBODIMENTS

The present invention is further described below in detail with reference to the accompanying drawings and specific preferred implementation manners.

Figure 1:
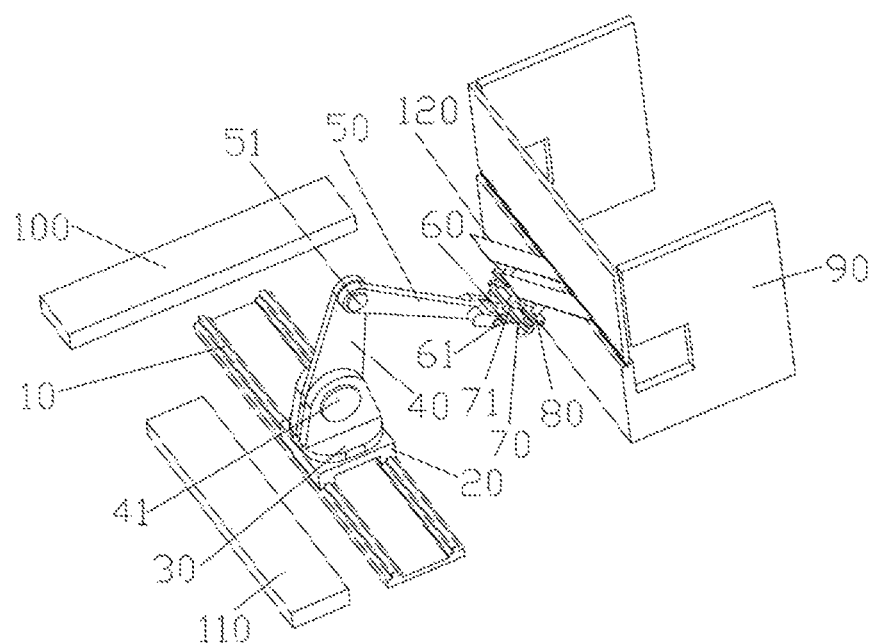
FIG. 1 is a schematic structural view of an auxiliary bending robot capable of processing two workpieces simultaneously according to the present invention.

As shown in FIG. 1, an auxiliary bending robot capable of processing two workpieces simultaneously includes a linear base slide rail 10, a slider 20, a rotational support 30, a movable major arm 40, a movable minor arm 50, a front arm 60, a swing link 70, and an additional seventh axis 80.

Figure 5:
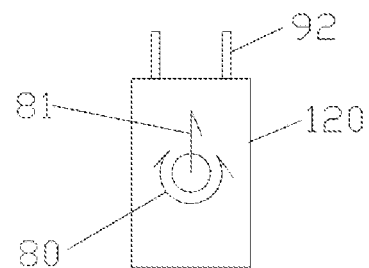
FIG. 5 is a schematic view of a moving direction of a movable axis and a rotating direction of an additional seventh axis.

The linear base slide rail is disposed on the side of a bending inlet of the bending machine 90. The linear base slide rail is preferably parallel to the bending inlet of the bending machine. Two sensor groups can be preferably disposed at the bending inlet of the bending machine. Each sensor group preferably includes two displacement sensors 92 shown in FIG. 5. Each sensor group can perform positioning measurement of position on a corresponding sheet metal plate, so as to facilitate the positioning adjustment of position and angle by a bending robot.

Blank material shelves 100 and finished materials shelves 110 are disposed on an outer side of a linear base slide rail and may have variable locations and quantities and can implement fully-automatic bending of a sheet metal plate 120 without manual intervention.

The slider is slidably connected to the linear base slide rail, and a first axis is formed between the slider and the linear base slide rail.

A top portion of the slider is directly or indirectly hinged to a rear end of the movable major arm through a second axis 41. Preferably, there are the following two preferred arrangement manners.

Embodiment 1

The rear end of the movable major arm is directly hinged to the top portion of the slider through the second axis. That is, the rotational support does not need to be included. In this case, the bending robot of this application is a five-axis robot, and has a larger range of movement as compared with a universal six-axis robot, and the first axis is a linear movement axis, so that the range of movement of the robot is extended.

Embodiment 2

Figure 3:
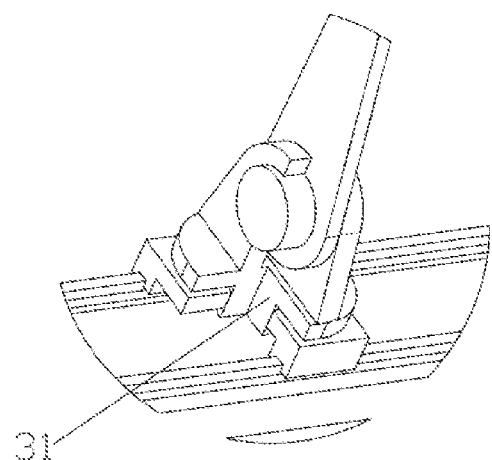
FIG. 3 is a schematic structural view of a half section of a rotational support and a slider.

The rear end of the movable major arm is indirectly hinged to the top portion of the slider through the second axis 41. As shown in FIG. 3, a bottom portion of the rotational support is rotatably connected to the top portion of the slider through an additional sixth axis 31, and a top portion of the rotational support is rotatably connected to a rear end of a movable major arm through the second axis. With the use of the rotational support, the bending robot of this application becomes a six-axis robot, so that the range of movement is large, blank material shelves and finished material shelves may have variable locations and quantities, and fully-automatic bending can be implemented without manual intervention.

A front end of the movable major arm is hinged to a rear end of the movable minor arm through a third axis 51, a front end of the movable minor arm is hinged to a rear end of the front arm through a fourth axis 61, and a front end of the front arm is rotatably connected to a middle portion of the swing link through a fifth axis 71.

Figure 2:
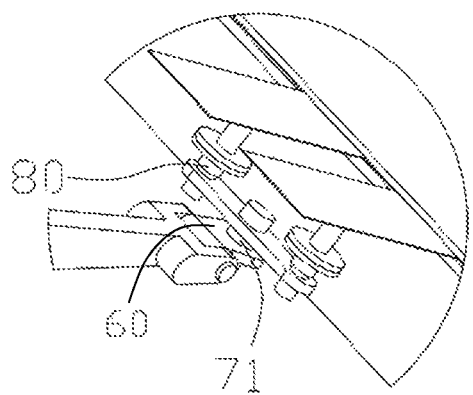
FIG. 2 is a schematic partially enlarged view of a fifth axis and an additional seventh axis in FIG. 1.

As shown in FIG. 2, there are two additional seventh axes, the two additional seventh axes are symmetrically disposed on the swing link on two sides of the fifth axis, and each of the additional seventh axes is directly or indirectly rotatably connected to the swing link. Specific preferred arrangement manners are as follows:

Manner 1: As shown in FIG. 2, a bottom portion of each of the additional seventh axes is directly rotatably connected to the swing link.

Figure 4:
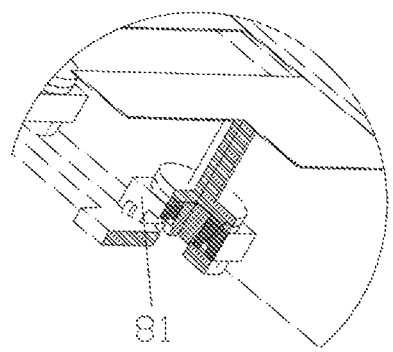
FIG. 4 is a schematic partially enlarged view when a movable axis is provided.

Manner 2: A bottom portion of each of the additional seventh axes is indirectly rotatably connected to a handle. A specific arrangement manner is: As shown in FIG. 4, the bending robot of this application further includes two movable axes 81. Each of the movable axes is disposed between the additional seventh axis and the swing link. The movable axis is slidably connected to the swing link. A bottom portion of the additional seventh axis is rotatably connected to the movable axis.

A slide direction of each movable axis along the swing link is perpendicular to a length direction of the swing link.

The first axis, the second axis, the third axis, and the fourth axis are all parallel to each other. Each of the additional seventh axes is parallel to the fifth axis. The fifth axis is perpendicular to the fourth axis. An axial line of the fifth axis and an axial line of the fourth axis preferably do not have an intersection. Therefore, this application can avoid mechanical interference between the fourth axis and the bending machine and is suitable for bending of small parts.

Certainly, as an alternative, the axial line of the fifth axis and the axial line of the fourth axis may intersect at a point. The present invention has different kinematic characteristics because of special processes of bending and can completely be inversely resolved even there is no intersection.

One fixture that can hold a sheet metal plate workpiece is disposed at a top portion of each of the additional seventh axes. There is a plurality of arrangement manners of the fixture. Preferably, there are the following three arrangement manners:

Preferred arrangement manner 1: The additional seventh axis and the fixture are integrated. That is, the additional seventh axis is a flange shaft, and a flange in the flange shaft is formed into the fixture. The flange is threadedly connected to a metal plate.

Preferred arrangement manner 2: The fixture is a vacuum sucker.

Preferred arrangement manner 3: The fixture is an electromagnet.

Certainly, as an alternative, the fixture may further be another known arrangement manner in the prior art.

A cartesian coordinate system is established by setting the origin on an axial line of the second axis, using a horizontal direction perpendicular to the axial line of the second axis as the X axis, and using a vertical direction as the Y axis, the coordinates of the center of the fourth axis in the cartesian coordinate system are ($d_x$, $d_y$), and formulas of calculating $d_x$ and $d_y$ are as follows:

$$d_x = X_0 - \sqrt{L_{10}^2 + L_{20}^2} \times \cos\left(\beta - \arctan\left(\frac{L_{10}}{L_{20}}\right)\right)$$

$$d_y = Y_0 - d + \sqrt{L_{10}^2 + L_{20}^2} \times \sin\left(\beta - \arctan\left(\frac{L_{10}}{L_{20}}\right)\right)$$

Figure 10:
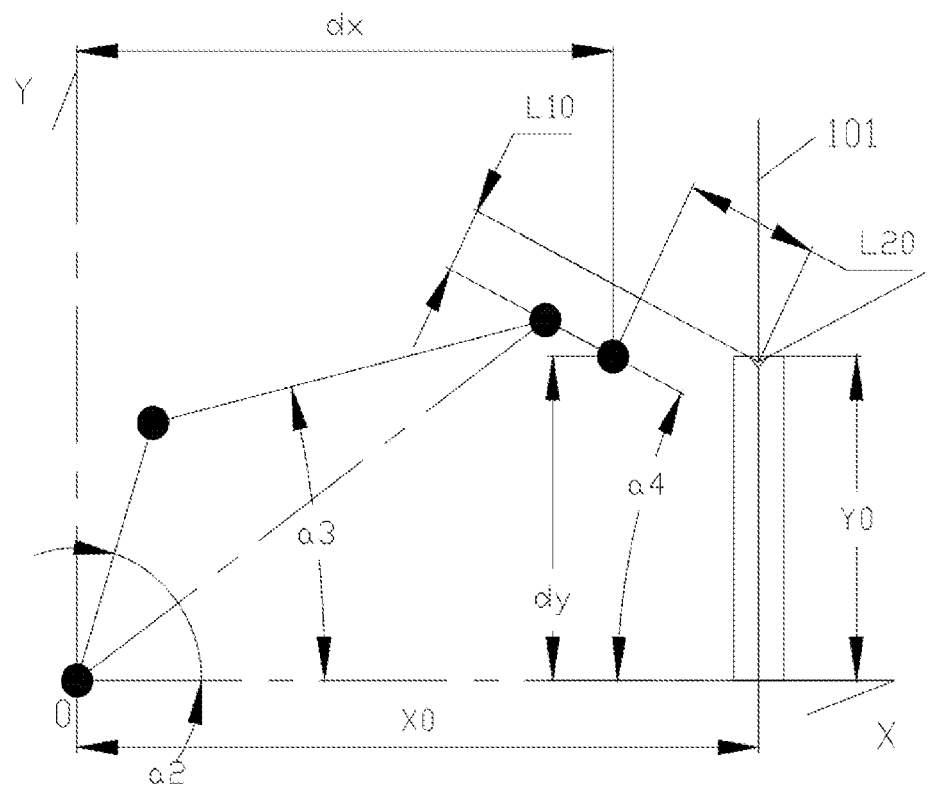
FIG. 10 is a schematic view of analyzing a bending movement in a cartesian coordinate system.

In the formulas, as shown in FIG. 10, $X_0$ is a distance along the X axis of a mold centerline in a bending machine, $Y_0$ is a lower die height of the bending machine, $L_{10}$ is a vertical offset distance of the fixture, $L_{20}$ is a horizontal offset distance of the fixture, and $\beta$ is an included angle between a sheet metal plate and a horizontal plane in a bending process.

The second axis, the third axis, and the fourth axis are linked to each other, it is assumed that a driving rotation angle of the second axis is $\theta_2$, a driving rotation angle of the third axis is $\theta_3$, a driving rotation angle of the fourth axis is $\theta_4$, and $\theta_2$, $\theta_3$, and $\theta_4$ satisfy the following formulas:

$$\theta_2 = a_2;$$

$$\theta_3 = a_3 - a_2;$$

$$\theta_4 = a_4 - a_3;$$

$$a_2 = \arctan\left(\frac{C_y}{C_x}\right) + \arccos\left(\frac{L_2^2 + C_x^2 + C_y^2 - L_3^2}{2L_2\sqrt{C_x^2 + C_y^2}}\right)$$

$$a_3 = \arctan\left(\frac{C_y - L_2\sin(a_2)}{C_x - L_2\cos(a_2)}\right)$$

$$a_4 = -\beta$$

$$C_x = d_x - L_4\cos(a_4)$$

$$C_y = d_y - L_4\sin(a_4)$$

Figure 9:
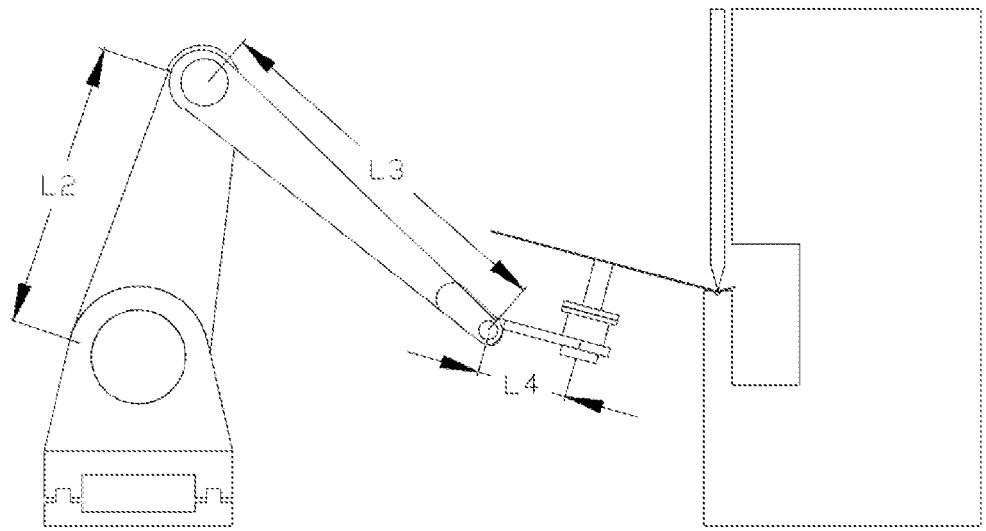
FIG. 9 is a schematic view of the sizes of a movable major arm, a movable minor arm, and a front arm.

In the formulas, $a_2$ is an included angle between the movable major arm and the X axis, $a_3$ is an included angle between the movable minor arm and the X axis, and $a_4$ is an included angle between the front arm and the X axis. As shown in FIG. 9, $L_2$ is the length of the movable major arm, $L_3$ is the length of the movable minor arm, $L_4$ is the length of the front arm, and $C_x$ and $C_y$ are intermediate variables.

The included angle $\beta$ between the sheet metal plate and the horizontal plane in the bending process is calculated by using the following formula:

$$\beta = \arctan\left(\frac{2d}{B}\right).$$

Figure 11:
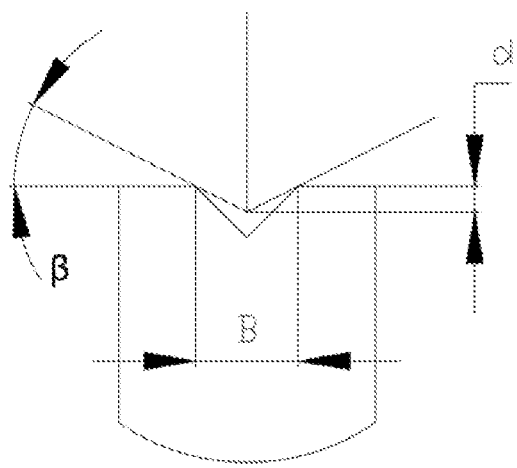
FIG. 11 is a diagram showing a relationship between an included angle $\beta$ between a sheet metal plate and a horizontal plane in a bending process and a lower die of a bending machine.

In the formula, as shown in FIG. 11, B is the width of a lower die slot in the bending machine, and d is the work stroke of an upper die in the bending machine. In the formulas, the influence of the thickness of a sheet metal plate is ignored.

Certainly, as an alternative, the included angle $\beta$ between the metal plate and the horizontal plane in the bending process may also be measured in another known manner such as detection using an angle sensor, which also falls within the protection scope of this application.

The foregoing additional seventh axis can adjust positioning deviations of an angle of a single sheet metal plate.

Figure 6:
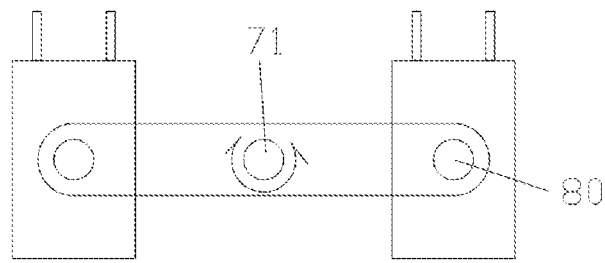
FIG. 6 is a schematic view of a relationship between a fifth axis and two additional seventh axes.
Figure 7:
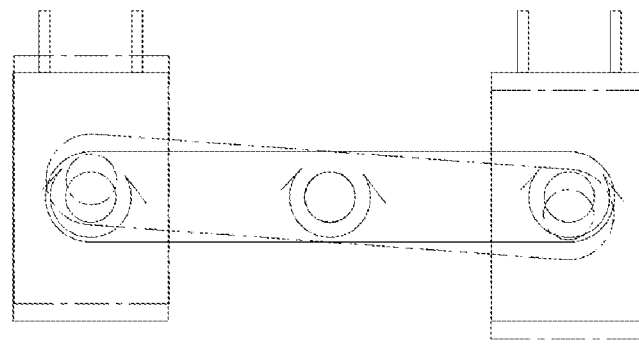
FIG. 7 is a schematic view of a process of positioning adjustment of positions of sheet metal plates by rotating a fifth axis.

The relationship between the fifth axis and two additional seventh axes is shown in FIG. 6. As the fifth axis rotates and the additional seventh axes are modified by rotating by small angles, the positioning precision of positions of two sheet metal plates can be adjusted, and the adjustment process is shown in FIG. 7.

Figure 8:
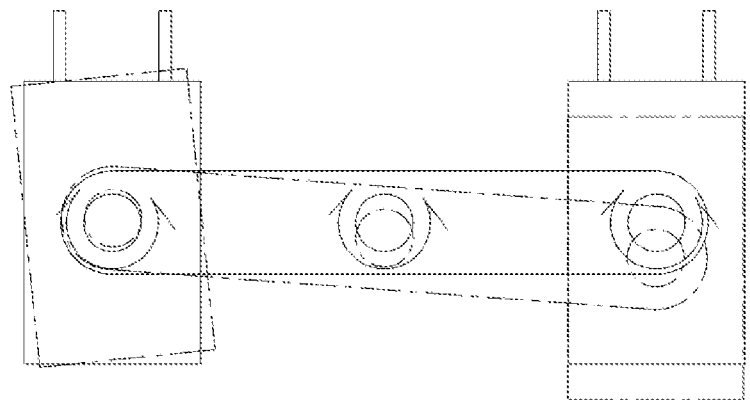
FIG. 8 is a schematic view of a process of positioning adjustment of positions and angles of a sheet metal by a fifth axis and an additional seventh axis being linked.

The fifth axis and the two additional seventh axes are linked, and as shown in FIG. 8, can implement adjustment of positioning precision of position and angle of two plates.

The preferred implementation manners of the present invention are described above in detail. However, the present invention is not limited to specific details in the foregoing implementation manners. Various equivalent variations may be made to the technical solutions of the present invention within the scope of the technical concept of the present invention. These equivalent variations all fall within the protection scope of the present invention.

What is claimed is:

1. An auxiliary bending robot capable of processing two workpieces simultaneously with a bending machine, comprising a linear base slide rail, a slider, a movable major arm, a movable minor arm, a front arm, a swing link, and two seventh axes, wherein
   the slider is slidably connected to the linear base slide rail, and a first axis is formed between the slider and the linear base slide rail;
   a top portion of the slider is directly or indirectly hinged to a rear end of the movable major arm through a second axis, a front end of the movable major arm is hinged to a rear end of the movable minor arm through a third axis, a front end of the movable minor arm is hinged to a rear end of the front arm through a fourth axis, and a front end of the front arm is rotatably connected to a middle portion of the swing link through a fifth axis;
   the two seventh axes are symmetrically disposed on the swing link on two sides of the fifth axis, and each of the two seventh axes is rotatably connected to the swing link;
   the first axis, the second axis, the third axis, and the fourth axis are all parallel to each other, each of the two seventh axes is parallel to the fifth axis, the fifth axis is perpendicular to the fourth axis, and one fixture capable of holding one of the workpieces is disposed at a top portion of each of the two seventh axes; and
   a rotational support, wherein a bottom portion of the rotational support is rotatably connected to the top portion of the slider through a sixth axis.

2. The auxiliary bending robot capable of processing two workpieces simultaneously with the bending machine according to claim 1, wherein a top portion of the rotational support is rotatably connected to the rear end of the movable major arm through the second axis.

3. The auxiliary bending robot capable of processing two workpieces simultaneously with the bending machine according to claim 1, wherein an axial line of the fifth axis and an axial line of the fourth axis do not have an intersection.

4. The auxiliary bending robot capable of processing two workpieces simultaneously with the bending machine according to claim 1, wherein a cartesian coordinate system is established by setting the origin on an axial line of the second axis, using a horizontal direction perpendicular to the axial line of the second axis as the X axis, and using a vertical direction as the Y axis, coordinate of the center of the fourth axis in the cartesian coordinate system is ($d_x$, $d_y$), and formulas of calculating $d_x$ and $d_y$ are as follows:

$$d_x = X_0 - \sqrt{L_{10}^2 + L_{20}^2} \times \cos\left(\beta - \arctan\left(\frac{L_{10}}{L_{20}}\right)\right)$$

$$d_y = Y_0 - d + \sqrt{L_{10}^2 + L_{20}^2} \times \sin\left(\beta - \arctan\left(\frac{L_{10}}{L_{20}}\right)\right)$$

wherein in the formulas, $X_0$ is a distance along the X axis of a mold centerline in the bending machine, $Y_0$ is a lower die height of the bending machine, $L_{10}$ is a vertical offset distance of the fixture, $L_{20}$ is a horizontal offset distance of the fixture, d is a work stroke of an upper die in the bending machine, and β is an included angle between a one of the workpieces and a horizontal plane in a bending process.

5. The auxiliary bending robot capable of processing two workpieces simultaneously with the bending machine according to claim 4, wherein the second axis, the third axis, and the fourth axis are linked to each other, a driving rotation angle of the second axis is $\theta_2$, a driving rotation angle of the third axis is $\theta_3$, a driving rotation angle of the fourth axis is $\theta_4$, and $\theta_2$, $\theta_3$, and $\theta_4$ satisfy the following formulas:

$$\theta_2 = a_2;$$

$$\theta_3 = a_3 - a_2;$$

$$\theta_4 = a_4 - a_3;$$

$$a_2 = \arctan\left(\frac{C_y}{C_x}\right) + \arccos\left(\frac{L_2^2 + C_x^2 + C_y^2 - L_3^2}{2L_2\sqrt{C_x^2 + C_y^2}}\right)$$

$$a_3 = \arctan\left(\frac{C_y - L_2\sin(a_2)}{C_x - L_2\cos(a_2)}\right)$$

$$a_4 = -\beta$$

$$C_x = d_x - L_4\cos(a_4)$$

$$C_y = d_y - L_4\sin(a_4)$$

wherein in the formulas, $a_2$ is an included angle between the movable major arm and the X axis, $a_3$ is an included angle between the movable minor arm and the X axis, $a_4$ is an included angle between the front arm and the X axis, $L_2$ is a length of the movable major arm, $L_3$ is a length of the movable minor arm, $L_4$ is a length of the front arm, and $C_x$ and $C_y$ are intermediate variables.

6. The auxiliary bending robot capable of processing two workpieces simultaneously with the bending machine according to claim 4, wherein the included angle β between one of the workpieces and the horizontal plane in the bending process is calculated by using the following formula:

$$\beta = \arctan\left(\frac{2d}{B}\right),$$

wherein in the formula, B is the width of a lower die slot in the bending machine.

7. The auxiliary bending robot capable of processing two workpieces simultaneously with the bending machine according to claim 1, further comprising two eighth axes, wherein each of the eighth axes is disposed between the two seventh axes and the swing link, each of the eighth axes is slidably connected to the swing link, and a bottom portion of each of the two seventh axes are rotatably and respectively connected to each of the eighth axes.

8. The auxiliary bending robot capable of processing two workpieces simultaneously with the bending machine according to claim 5, wherein the included angle β between one of the workpieces and the horizontal plane in the bending process is calculated by using the following formula:

$$\beta = \arctan\left(\frac{2d}{B}\right),$$

wherein in the formula, B is the width of a lower die slot in the bending machine.

* * * * *